(12) United States Patent
Sugiura et al.

(10) Patent No.: US 6,780,556 B2
(45) Date of Patent: *Aug. 24, 2004

(54) EXTERNAL ADDITIVE FOR ELECTROPHOTOGRAPHIC TONER, METHOD FOR MANUFACTURING THE EXTERNAL ADDITIVE, ELECTROPHOTOGRAPHIC TONER USING THE EXTERNAL ADDITIVE, AND IMAGE FORMING APPARATUS USING THE ELECTROPHOTOGRAPHIC TONER

(75) Inventors: Hideki Sugiura, Shizuoka-ken (JP); Tomio Kondou, Shizuoka-ken (JP)

(73) Assignee: Ricoh Company Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/086,415

(22) Filed: Mar. 4, 2002

(65) Prior Publication Data

US 2003/0031946 A1 Feb. 13, 2003

(30) Foreign Application Priority Data

Mar. 2, 2001 (JP) ........................................ 2001-059027

(51) Int. Cl.$^7$ ................................................. G03G 9/00
(52) U.S. Cl. .............................. 430/108.3; 430/108.6; 430/108.7; 399/252
(58) Field of Search .................... 430/108.3, 108.6, 430/108.7; 399/252

(56) References Cited

U.S. PATENT DOCUMENTS

| | | | |
|---|---|---|---|
| 4,762,763 A | 8/1988 | Nomura et al. | |
| 5,164,774 A | 11/1992 | Tomita et al. | |
| 5,380,616 A | 1/1995 | Aoki et al. | |
| 5,519,316 A | 5/1996 | Hagiwara et al. | |
| 5,527,657 A | 6/1996 | Takeda et al. | |
| 5,882,832 A | 3/1999 | Tosaka et al. | |
| 5,981,131 A | 11/1999 | Hirama et al. | |
| 6,004,711 A | * 12/1999 | Bourne et al. | ........... 430/106.2 |
| 6,004,715 A | 12/1999 | Suzuki et al. | |
| 6,168,894 B1 | 1/2001 | Aoki et al. | |
| 6,183,926 B1 | 2/2001 | Kuroda et al. | |
| 6,258,502 B1 | 7/2001 | Nakamura et al. | |
| 6,360,068 B1 | 3/2002 | Kinoshita et al. | |
| 6,363,229 B1 | 3/2002 | Shiraishi et al. | |
| 6,368,765 B2 | 4/2002 | Izu et al. | |
| 6,406,826 B1 | 6/2002 | Suzuki et al. | |
| 6,432,589 B1 | 8/2002 | Uchinokura et al. | |
| 6,447,973 B1 | 9/2002 | Asami et al. | |
| 6,468,706 B2 | 10/2002 | Matsuda et al. | |
| 6,503,676 B2 | * 1/2003 | Yamashita et al. | ........ 430/108.3 |
| 6,503,681 B2 | 1/2003 | Makino et al. | |

FOREIGN PATENT DOCUMENTS

| | | |
|---|---|---|
| EP | 0 288 693 A2 | 11/1988 |
| EP | 0 722 992 A1 | 7/1996 |
| EP | 1 016 932 A1 | 7/2000 |
| EP | 1 031 885 A1 | 8/2000 |
| EP | 1 065 570 A1 | 1/2001 |
| EP | 1 150 175 A1 | 10/2001 |
| EP | 1 204 006 A1 | 5/2002 |
| JP | 7-3600 | 1/1995 |
| JP | 2568244 | 10/1996 |
| JP | 3120016 | 10/2000 |
| JP | 3145562 | 1/2001 |

* cited by examiner

Primary Examiner—Mark A. Chapman
(74) Attorney, Agent, or Firm—Oblon, Spivak, McClelland, Maier & Neustadt, P.C.

(57) ABSTRACT

An external additive for a toner, having an average primary particle diameter not greater than 100 nm and including at least inorganic fine particles and a hydrophobizing agent applied to the surface of the inorganic fine particles, wherein after the external additive is treated with chloroform, pyrolysates of the residual components include a compound having at least one structure selected from organopolysiloxane structures and ring siloxane structures.

35 Claims, 7 Drawing Sheets

EXTERNAL ADDITIVE FOR ELECTROPHOTOGRAPHIC TONER, METHOD FOR MANUFACTURING THE EXTERNAL ADDITIVE, ELECTROPHOTOGRAPHIC TONER USING THE EXTERNAL ADDITIVE, AND IMAGE FORMING APPARATUS USING THE ELECTROPHOTOGRAPHIC TONER

BACKGROUND OF THE INVENTION

1. Field of the Invention

The present invention relates to an external additive used for an electrophotographic toner and to the toner used for a developer for developing an electrostatic latent image in electrophotography, electrostatic recording and electrostatic printing and the like, as well as to an electrophotographic image forming apparatus using the toner.

2. Discussion of the Background

Typically, a developer used in electrophotography, electrostatic recording and electrostatic printing and the like is adhered to an image bearer such as photoreceptors on which a latent image is formed in a developing process; transferred on a transfer medium such as transfer sheets in a transferring process; and fixed on the transfer sheet in a fixing process.

As the developer for developing the latent image formed on the surface of the image bearer, a two-component developer including a carrier and a toner and a one-component developer (magnetic or nonmagnetic toner) which does not need a carrier are known.

As a toner included in the developer, a positively charged toner and a negatively charged toner are available in compliance with electrostatic latent images and the processes. As an additive for a toner positively charged, a charge controlling agent such as nigrosin dyes and quaternary ammonium salt; a coating agent to impart a predetermined chargeability to the carrier such as acrylic resins, fluorocarbon resins and silicone resins, etc.; and the like are known. On the other hand, as an additive for a toner negatively charged, a charge controlling agent such as azo dyes including metals; inorganic powders; organic powders; coating agent for the carrier; and the like are known.

In addition, a method in which inorganic powders and the like such as various metal oxides are mixed with toner particles is proposed for the purpose of improving the fluidity and the chargeability of the toner, and such inorganic powders and the like are called external additives. Also, a method in which the surfaces of the inorganic powders are optionally treated with a specific silane coupling agent, a titanate coupling agent, a silicone oil, organic acids, etc. and a method in which the surfaces are optionally coated with specific resins are proposed for the purpose of improving the hydrophobicity and the chargeability of the surface of the inorganic powders. As the inorganic powders, for example, silicon dioxide (silica), titanium dioxide (titania), aluminium oxide, zinc oxide, magnesium oxide, cerium oxide, iron oxide, copper oxide, tin oxide, etc. are known.

Particularly, the silica and hydrophobized fine particles of silica whose silanol group is substituted with an organic group by reacting fine particles of titanium oxide with organic silicon compounds such as dimethyldichlorosilane, hexamethyldisilazane and silicone oil are used.

Among these additives, silicone oil is preferably used as the hydrophobizer because it has sufficient hydrophobicity and when included in the toner, the toner has excellent transferability due to the low surface energy of the silicone oil. The hydrophobicity of the silica treated with the silicone oil is disclosed in Japanese Patent Publication No. 7-3600 and Japanese Patent No. 2568244. In addition, Japanese Laid-Open Patent Publications Nos. 7-271087 and 8-29598 disclose the content of the silicone oil and the content ratio of a carbon atom in an additive.

In order to obtain the charging stability of a developer under a condition of high humidity when hydrophobizing inorganic fine particles which are mother agents of an additive, the above-mentioned content of the silicone oil and the hydrophobicity are sufficient.

However, it is not positively attempted to decrease the adherence of the developer to a member contacting the developer such as a contact charger, a developer carrier (a sleeve), a doctor blade, a carrier, an electrostatic latent image bearer (a photoreceptor) and an intermediate transfer medium by taking advantage of the low surface energy which is one of important properties of the silicone oil. Particularly, background fouling and hollow characters (portions on which the developer is not transferred) of characters, lines, and the edge and the center of dot images after image transfer due to the strong adherence of the developer to the photoreceptor cannot be improved only by adjusting the content and the hydrophobicity of the silicone oil. Further, hollow characters due to the inability of the developer to transfer on a concave portion of a transferring member having many concavities and convexities cannot be improved either.

Japanese Laid-Open Patent Publication No. 11-212299 discloses inorganic fine particles including a specific content of the silicone oil as a liquid content. However, such a definition of the quantity cannot satisfy the above-mentioned properties. In addition, it is neither referred to how the silicone oil or a component capable of performing an equivalent function to the silicone oil is treated and adhered to inorganic particles nor referred to the effective structures of the silicone oil and the component. Further, information of mixed condition of the silicone oil and the component with the inorganic fine particles is not available.

SUMMARY OF THE INVENTION

Accordingly, an object of the present invention is to provide an external additive for use in a developer producing a high-quality image having appropriate image density and very little background fouling even when producing many copy images for a long period of time without contaminating a charger; an image developer; a photoreceptor; and an intermediate transfer medium, and to provide an electrophotographic image forming apparatus using the developer.

In addition, another object of the present invention is to provide an external additive for use in a developer producing a stable image having high image-reproducibility on any transfer medium without producing a blurred image; an image with hollow characters; and scattering toner, and to provide an electrophotographic image forming apparatus using the developer.

Briefly these objects and other objects of the present invention as hereinafter will become more readily apparent can be attained by using hydrophobized inorganic fine-particles having not more than a specific particle diameter, and including at least a compound having an organosiloxane structure in the solvent-treated residual components or a ring siloxane structure in the pyrolysates of the solvent-treated residual components as an external additive for an electrophotographic toner.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
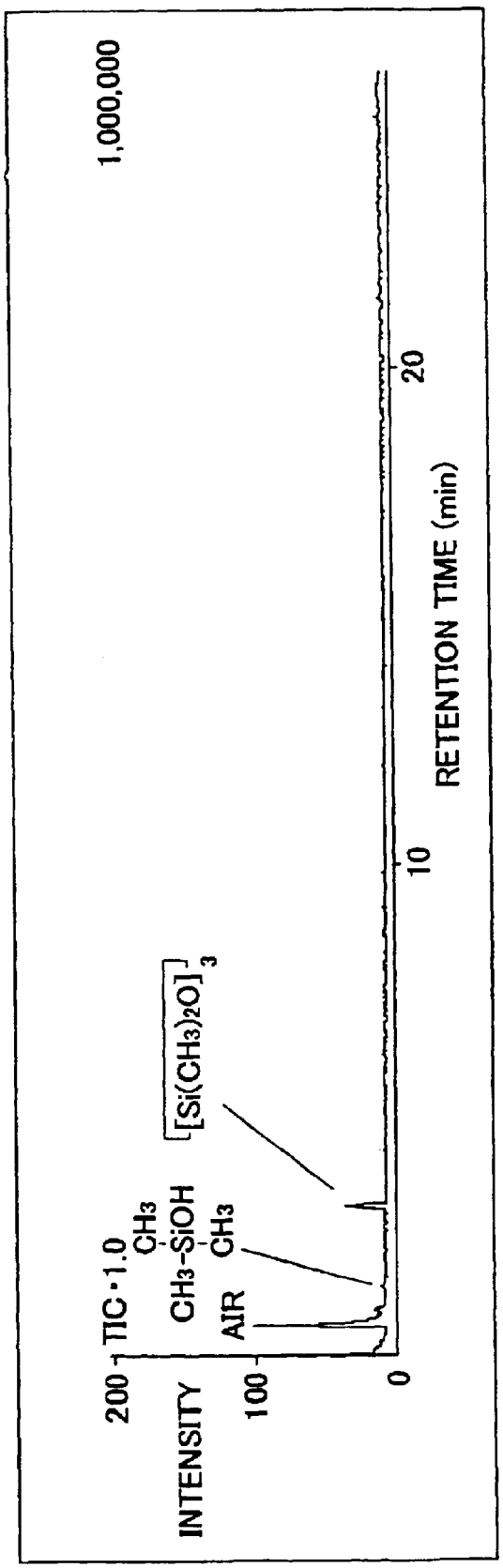
FIG. 1 is a pyrolysis gas chromatography and mass spectroscopy (Py-GCMS) chromatogram showing the pyrolysates of the residual components of an external additive treated with chloroform prepared in Example 3.

Generally, the present invention provides a developer producing a high-quality image having appropriate image density and very little background fouling even when producing many copy images for a long period of time without contaminating a charger; an image developer; a photoreceptor; and an intermediate transfer medium, and an electrophotographic image forming apparatus using the developer.

In addition, a developer producing a stable image having high image-reproducibility on any transfer medium without producing a blurred image; an image with hollow characters; and scattering toner, and an electrophotographic image forming apparatus using the developer.

Within the context of the present invention, the term "external additive" means an additive that, in use with a toner, is adhered on at least a portion of the surface of the toner to improve the toner properties, such as fluidity. Preferably, the external additive is not incorporated into the interior of the mother toner particle itself.

When a compound having an organosiloxane structure exists in solvent-treated residual components of inorganic fine particles used as an external additive for an electrophotographic toner, the inorganic fine particles include a silicone oil which is not easily released from the surface of the external additive by a solvent treatment and firmly absorbed in the additive or a component which comes from the compound having an organosiloxane structure such as an organopolysiloxane structure chemically bonded with the surface of the external additive.

When the external additive includes the silicone oil which is not released from the surface of the additive and physically absorbed therein or the compound having an organopolysiloxane structure chemically bonded therewith, scrapes and abrasion of a photoreceptor can be prevented because the additive decreases the friction coefficient of the surface of the photoreceptor due to its low surface energy. In addition, a high-quality image without background fouling can be produced because adherence of contaminants, and reverse and low charging materials included in a developer and a transfer medium such as papers to the surface of the photoreceptor can be prevented.

Further, the external additive including the silicone oil which is not released from the surface of the additive and physically absorbed therein or the compound having an organopolysiloxane structure chemically bonded therewith can increase the adherence between the toners surrounded by the similar external additives, and can contrarily decrease the adherence of the toner to the photoreceptor and the intermediate transfer medium. Ordinarily, portions on which developers adhere much such as characters; lines; and the edge and center of dots are compressed by the transfer medium, and the adherence of the toner to the photoreceptor and the intermediate transfer medium is increased. Therefore the toner cannot be transferred by the electric field strength, resulting in the hollow characters.

However, the present inventors discovered that when the external additive includes the silicone oil which is not released from the surface of the additive and physically absorbed therein or the compound having an organopolysiloxane structure chemically bonded therewith, the adherence to the photoreceptor and the intermediate transfer medium of the toner is decreased and the hollow characters do not occur even when the developer is compressed with an inflexible and stiff transfer medium.

Ordinarily, in order to prevent the hollow characters, a method in which the external additive is increased to increase the surface coverage of the toner and to decrease the adherence to the photoreceptor thereof is used. However, in this case, a blurred image and toner scattering tend to occur adversely because the transfer medium sensitively reacts with the mutual electrostatic repulsion of the toner. In the present invention, an excellent effect of solving the problems of hollow characters, blurred images and toner scattering at the same time was also discovered.

In addition, the present invention exerts its effect most in a full-color image forming system in which multiply overlapped image-development and transfer are made on the intermediate transfer medium and the transfer medium.

Since the mutual toner agglutinability is increased, many toner particles can be uniformly transferred together even on a transfer medium having many concavities and convexities and a transfer sheet in which a distance between the fibers is long.

Further, in an image forming method including at least a mechanism which drives the electrostatic latent image bearer by contacting the transfer material to the bearer, a high pressure is inevitably placed between the bearer and the transfer material when the transfer material is driven. Therefore, problems such as hollow characters tend to occur, but the present invention exerts its effect even in such a system as well.

Generally, a hydrophobizing agent such as a silicone oil is soluble in a solvent such as chloroform, and inorganic fine particles are insoluble in a solvent. Therefore, the hydrophobizing agent such as a silicone oil is easily dissolved in a solvent and does not remain in the insoluble components. Accordingly, in order to prove if inorganic fine particles include an silicone oil which is not easily released from the surface of the external additive and firmly and physically absorbed in the surface thereof or the compound having an organopolysiloxane structure which is not easily released from the surface of the external additive and is chemically bonded with the surface thereof, the method of observing the residual components after the solvent treatment as mentioned above is suitable.

In addition, it is discovered that when the pyrolysates of the solvent-treated residual components of the external additive includes at least a compound having a ring siloxane structure, the same effect as that of the case where the compound having an organopolysiloxane structure is included in the insoluble components of the solvent-treated external additive. Further, when the ring includes at least not less than four members, the effect of the present invention is more effectively exerted because the external additive has low surface energy. In addition, these effects can be exerted not only by hydrophobizing the external additive but also by including at least a compound having an organopolysiloxane structure in the insoluble components of the solvent-treated toner or at least a compound having a ring siloxane structure in the pyrolysates of the insoluble components of the solvent-treated toner.

Preferably, the pyrolysates of the insoluble components contain a compound having at least one structure selected from the group consisting of organopolysiloxane structures and ring siloxane structures. More preferred of the organopolysiloxane structures is a compound having the organopolysiloxane structure of the following formula (A):

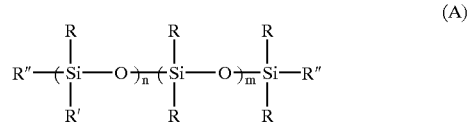

(A)

wherein R represents an alkyl group having from 1 to 3 carbon atoms; R' represents a silicone oil modification group; R" represents an alkyl group having from 1 to 3 carbon atoms or an alkoxy group; and n and m are independently an integer and satisfy the following relationship:

$1 \leq (n+m)$.

Within the context of the present invention, the term "silicone oil modification group" indicates a group selected from alkyl groups (preferably having 1–4 carbon atoms), halogen substituted alkyl groups (preferably having 1–4 carbon atoms) and unsubstituted or substituted phenyl.

More preferred of the ring siloxane compounds are ring siloxane structures of the following formula (B):

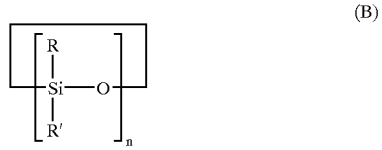

(B)

wherein R represents an alkyl group having from 1 to 3 carbon atoms; R' represents a silicone oil modification group; and n is an integer not less than 3, more preferably not less than 4.

Hereinafter, the external additive for an electrophotographic toner, the electrophotographic toner and the electrophotographic image forming apparatus of the present invention will be explained in detail.

Hydrophobizing Agent

As the hydrophobizing agents for use in the present invention, for example, silicone oils, silane coupling agents, silylation agents, silane coupling agents having a fluorinated alkyl group, organic titanium coupling agents, aluminum coupling agents, and their combinations, etc. can be used. Specific examples of such hydrophobizing agents include dimethyldichlorosilane, trimethylchlorosilane, methyltrichlorosilane, allyldimethylchlorosilane, allylphenyldichlorosilane, benzyldimethylchlorosilane, bromomethyldimethylchlorosilane, α-chloroethyltrichlorosilane, p-chloroethyltrichlorosilane, chloromethyldimethylchlorosilane, chloromethyltrichlorosilane, p-chlorophenyltrichlorosilane, 3-chloropropyltrichlorosilane, 3-chloropropyltrimethoxylsilane, vinyltriethoxysilane, vinylmethoxysilane, vinyl-tris(β-methoxyethoxy)silane, γ-methacryloxypropyltrimethoxysilane, vinyltriacetoxysilane, divinyldichlorosilane, dimethylvinylchlorosilane, octyl-trichlorosilane, decyl-trichlorosilane, nonyl-trichlorosilane, (4-tert-propylphenyl)-trichlorosilane, (4-tert-butylphenyl)-trichlorosilane, dipentyl-dichlorosilane, dihexyl-dichlorosilane, dioctyl-dichlorosilane, dinonyl-dichlorosilane, didecyl-dichlorosilane, didodecyl-dichlorosilane, dihexadecyl-dichlorosilane, (4-tert-butylphenyl)-octyl-dichlorosilane, dioctyl-dichlorosilane, didecenyl-dichlorosilane, dinonenyl-dichlorosilane, di-2-ethylhexyl-dichlorosilane, di-3,3-dimethylpentyl-dichlorosilane, trihexyl-chlorosilane, trioctyl-chlorosilane, tridecyl-chlorosilane, dioctyl-methyl-chlorosilane, octyl-dimethyl-chlorosilane, (4-tert-propylphenyl)-diethyl-chlorosilane, octyltrimethoxysilane, hexamethyldisilazane, hexaethyldisilazane, hexatolyldisilazane, etc., but are not limited thereto.

Silicone Oil

Specific examples of the silicone oils for use in the present invention include dimethylsilicone oils, methylphenylsilicone oils, chlorophenylsilicone oils, methylhydrodienesilicone oils, alkyl-modified silicone oils, fluorine-modified silicone oils, polyether-modified silicone oils, alcohol-modified silicone oils, amino-modified silicone oils, epoxy-modified silicone oils, epoxy/polyether-modified silicone oils, phenol-modified silicone oils, carboxyl-modified silicone oils, mercapto-modified silicone oils, acrylic-modified silicone oils, methacrylic-modified silicone oils, α-methylstyrene-modified silicone oils, etc.

Inorganic Fine Particles

Specific examples of the inorganic fine particles for use in the present invention include silica, alumina, titanium oxide, barium titanate, magnesium titanate, calcium titanate, strontium titanate, iron oxide, copper oxide, zinc oxide, tin oxide, silica sand, clay, mica, wollastonite, diatom earth, chromium oxide, cerium oxide, red iron oxide, antimony trioxide, magnesium oxide, zirconium oxide, barium oxide, barium carbonate, calcium carbonate, silicon carbide, silicon nitride, etc. Among these materials, silica and titanium dioxide are preferably used. The addition quantity of the inorganic particulate material is from 0.1 to 5% by weight, and preferably from 0.3 to 3% by weight of the toner.

Specific examples of the inorganic fine particles preferably used in the present invention include MOX80 having an average particle diameter of about 30 nm, OX50 having an average particle diameter of about 40 nm, and TT600 having an average particle diameter of about 40 nm, all of which are manufactured by Nippon Aerosil Co.; IT-PB having an average particle diameter of about 40 nm, and IT-PC having an average particle diameter of about 60 nm, both of which are manufactured by Idemitsu Kosan Co., Ltd.; and TAF110A having an average particle diameter of from about 40 nm to 50 nm, and TAF510 having an average particle diameter of from about 40 nm to 50 nm, both of which are manufactured by Fuji Titanium Industry Co., Ltd. These inorganic materials can be used alone or in combination when used for an electrophotographic toner.

Particle Diameter of Inorganic Fine Particles

The average primary particle diameter of the inorganic fine particles treated with a hydrophobizing agent is preferably not greater than 100 nm, and more preferably from 5 to 70 nm. When the diameter is smaller than this range, the inorganic fine particles are buried in the toner and they hardly work effectively. When the diameter is larger than the range, the surface area of the inorganic fine particles decreases and the contact area with a photoreceptor of the compound having an organopolysiloxane structure of the inorganic fine particles or the silicone oil firmly absorbed therein decreases, and they hardly work effectively either. In the present invention, the average particle diameter of the inorganic fine particles is the number average particle diameter. The average particle diameter of the inorganic fine particles for use in the present invention can be measured by a particle-diameter-distribution measuring instrument utilizing dynamic light scattering. Specific examples of the instruments include DLS-700 manufactured by Otsuka Electronics Co., Ltd. and Coulter N4 manufactured by Coulter Electronics, Inc. However, since it is difficult to dissociate secondary particles after hydrophobized, it is preferable to directly determine the primary particle diameter using a scanning electron microscope or a transmission electron microscope. In this case, at least 100 particles of inorganic fine particles are observed to obtain the average of the major particle diameter thereof.

Hydrophobizing Method (1) Inorganic fine particles are dried in an oven having a temperature of several hundred degree C. to fully remove water therefrom; and (2) the inorganic fine particles are uniformly contacted with a hydrophobizing agent such that the hydrophobizing agent adheres on the surface thereof.

In order to adhere a hydrophobizing agent to inorganic fine particles, for example, one of the following methods can be used:

(1) inorganic fine particles are directly mixed with a hydrophobizing agent using a mixer having a rotating blade or the like mixer; and (2) inorganic fine particles are dipped into a mixture of a hydrophobizing agent and a solvent having relatively low boiling point and capable of diluting the hydrophobizing agent, and then the solvent is dried to remove the solvent therefrom.

When the hydrophobizing agent has a high viscosity, it is preferable to use the latter method.

The inorganic fine particles treated with the hydrophobizing agent is then heated in an oven having a temperature of from 100° C. to several hundred degree C. By this heat treatment, the metal in the inorganic fine particles can be combined with the hydrophobizing agent by forming a siloxane bonding using a hydroxyl group on the surface of the inorganic fine particles, and/or the hydrophobizing agent itself can be polymerized and crosslinked. In this case, a catalyst such as acids, alkalis, metal salts such as zinc octylate, tin octylate and dibutyl tin dilaurate may be added to the hydrophobizing agent to accelerate the reaction. When a silicone oil is used as the hydrophobizing agent in this case, the silicone oil preferably exerts its effect. In addition, the inorganic fine particles may be treated with a silicone oil after treated with hydrophobizing agent such as silane coupling agent because preliminarily hydrophobized inorganic fine particles absorbs more silicone oil. By this heat treatment, inorganic fine particles including a compound having an organopolysiloxane structure in the solvent-treated residual components or inorganic fine particles including at least a compound having a ring siloxane structure in the pyrolysates of the solvent-treated residual components are formed.

The organopolysiloxane structure or ring siloxane structure in the present invention is considered to come from the silicone oil physically and firmly adsorbed in the fine holes on the surface of the inorganic fine particles or the compound having an organopolysiloxane structure chemically bonded with the surface of the inorganic fine particles. Specifically, the compound having an organopolysiloxane structure or ring siloxane structure is included in the insoluble components which are not easily dissolved in a solvent, etc., and is detected by the method mentioned below.

Measurement of Solvent-Treated Residual Components

The structure of the solvent-treated residual components can be determined by the following pyrolysis gas chromatography and mass spectroscopy (Py-GCMS) method. However, the measuring method is not limited thereto.

1. Solvent Treatment

A sample is dipped into chloroform, and the mixture is agitated and then left untouched. The mixture is centrifuged and then the supernatant is removed to obtain the solid content. Then chloroform is added to the solid content, and the mixture is agitated and then left untouched. This procedure is repeated to obtain solvent-treated residual components. The components are analyzed by the following Py-GCMS method.

2. Py-GCMS Analysis

The analysis is performed under the following conditions using the following instrument.

Instrument: QP5000 and CRASS-5000 manufactured by Shimadzu Corp.

Pyrolysis gas chromatography: JHP-35 manufactured by Nippon Analytical Instruments Co., Ltd.

Pyrolysis temperature: 670° C. for 4 seconds

Column: DB-5 manufactured by J & W Co.
30 m (length)
0.25 mm (inside diameter)
0.25 $\mu$m (film thickness)

Column temperature: 40° C. (maintained for 2 minutes) to 320° C.

Column temperature rising speed: 10° C./min

Injection temperature: 320° C.

Pressure of carrier gas: 90 kPa (maintained for 2 min.) to 150 kPa

Pressure rising speed: 2 kPa/min

Ionization method: EI method

Electronic voltage: 70 eV

Mass detection range: 25 m/z to 650 m/z

Rod used for analysis: cylindrical quadrapole

Voltage of detector: 1.10 V

The compound having an organopolysiloxane structure and ring siloxane structure can be measured by analyzing the Py-GC pyrogram and mass spectrum pattern.

Other Inorganic Fine Particles

In the present invention, other known inorganic fine particles which are not subjected to the surface treatment and/or those which are subjected to the surface treatment with a silicone oil or other hydrophobizing agents may be used alone or in combination in the toner together with the external additive of the present invention. Specific examples of the hydrophobizing agents include silane coupling agents, silylation agents, silane coupling agents having a fluorinated alkyl group, organic titanate coupling agents, aluminum coupling agents and the like.

The inorganic fine particles used together preferably has an average particle diameter less than that of the external additive of the present invention. The smaller inorganic fine particles increase the coverage of the surface of the toner, and good fluidity can be imparted to the developer. Therefore, the resultant toner images have good image-reproducibility, and good image density. In addition, the agglomeration and solidification of the toner can be prevented. The content of the inorganic fine particles in the toner is from 0.01 to 5% by weight, and preferably from 0.1 to 2% by weight.

Fine Particles of Resin

Specific examples of fine particles of resins include polymers such as polystyrene, polymethacrylate and polyacrylate and their copolymers; polycondensation polymers such as silicone resins, benzoguanamine resins and nylon resins; and thermosetting resins, etc. These resins can be prepared by a method such as soap-free emulsion polymerization methods, suspension polymerization methods and dispersion polymerization methods.

When the fine particles of resins are used together with the toner, the chargeability of the developer can be strengthened and toner particles having a reverse charge can be reduced, and therefore, background fouling can be prevented. The addition quantity of the fine particles of resins is 0.01 to 5% by weight, and preferably from 0.1 to 2% by weight, of the toner.

Toner Composition

The toner of the present invention includes at least a binder resin and a colorant, having a volume average particle diameter not greater than 15 μm, and the external additive of the present invention is mixed with the toner.

With respect to the constituents and manufacturing method of the toner of the present invention, known materials and manufacturing methods can be used.

Specific examples of the binder resin for use in the toner of the present invention include styrene polymers and substituted styrene polymers such as polystyrene, poly-p-chlorostyrene and polyvinyltoluene; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers; and other resins such as polymethyl methacrylate, polybutyl methacrylate, polyvinyl chloride, polyvinyl acetate, polyethylene, polypropylene, polyesters, epoxy resins, epoxy polyol resins, polyurethane resins, polyamide resins, polyvinyl butyral resins, acrylic resins, rosin, modified rosins, terpene resins, aliphatic or alicyclic hydrocarbon resins, aromatic petroleum resins, chlorinated paraffin, paraffin waxes, etc. These resins are used alone or in combination.

Further the binder resin preferably includes a polyol resin having a polyoxyalkylene moiety in its main chain. The polyol resin is preferably a reaction product of: (a) an epoxy resin; (b) a dihydric phenol; and either (c) an adduct of a dihydric phenol with an alkylene oxide or (c') a glycidyl ether of an adduct of a dihydric phenol with an alkylene oxide. The epoxy resin is preferably a reaction product of a bisphenol such as bisphenol A and bisphenol F with epichlorohydrin. As the divalent group, bisphenol A, bisphenol F, etc are exemplified. Specific examples of the adduct of a dihydric phenol with an alkylene oxide include reaction products of ethylene oxide, propylene oxide, butylene oxide or their mixture with a bisphenol such as bisphenol A or bisphenol F. These reaction products can be further reacted with epichlorohydrin or β-methylepichlorohydrin to produce their glycidyl ether compounds. In addition, the reaction products may be reacted with a monohydric phenol such as phenol, cresol, isopropylphenol, aminophenol, octylphenol, nonylphenol, dodecylphenol and p-cumylphenol Suitable colorants include known dyes and pigments. Specific examples of the colorants include carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and the like. These materials are used alone or in combination. The content of the colorant in the toner is preferably from 0.1 to 50 parts by weight per 100 parts by weight of the binder resin included in the toner.

The developer of the present invention may include a charge controlling agent, if desired. Specific examples of the charge controlling agent include known charge controlling agents such as Nigrosine dyes, triphenylmethane dyes, metal complex dyes including chromium, chelate compounds of molybdic acid, Rhodamine dyes, alkoxyamines, quaternary ammonium salts (including fluorine-modified quaternary ammonium salts), alkylamides, phosphor and compounds including phosphor, tungsten and compounds including tungsten, activators including fluorine, metal salts of salicylic acid, salicylic acid derivatives, etc. Specific examples of the marketed products of the charge controlling agents include Bontron 03 (Nigrosine dyes), BONTRON P-51 (quaternary ammonium salt), BONTRON S-34 (metal-containing azo dye), E-82 (metal complex of oxynaphthoic acid), E-84 (metal complex of salicylic acid), and E-89 (phenolic condensation product), which are manufactured by Orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and NX VP434 (quaternary ammonium salt), which are manufactured by Hoechst AG; LRA-901, and LR-147 (boron complex), which are manufactured by Japan Carlit Co., Ltd.; copper phthalocyanine, perylene, quinacridone, azo pigments and polymers having a functional group such as a sulfonate group, a carboxyl group, a quaternary ammonium group and the like; etc.

The content of the charge controlling agent in the present invention depends on the species of the binder resin used, whether other additives are present, and the method for manufacturing the toner. In general, the content is from 0.1 to 10 parts by weight, and preferably from 2 to 5 parts by weight, per 100 parts by weight of the binder resin included in the toner. When the content is over 10 parts by weight, the resultant toner is charged too much and the effect of the charge controlling agent is decreased. Therefore, the electrostatic attraction between the toner and a developing roller increases, resulting in deterioration of fluidity of the developer and decrease of image density of the resultant images.

The toner preferably includes a wax to improve the releasability thereof. Suitable waxes for use in the toner include waxes having a melting point of from 40 to 120° C. and preferably from 50 to 110° C. When the melting point of the wax included in the toner is too high, the low temperature fixability of the resultant toner deteriorates. To the contrary, when the melting point is too low, the offset resistance and durability of the resultant toner deteriorate. The melting point of waxes can be determined by a method using a differential scanning calorimeter (i.e., DSC). Namely, a few milligrams of a sample is heated at a constant heating speed (for example, 10° C./min) to determine the temperature at which the sample melts (i.e., a peak of the sample due to melting of the sample is observed).

Specific examples of the waxes include solid paraffin waxes, microcrystalline waxes, rice waxes, fatty acid amide waxes, fatty acid waxes, aliphatic monoketones, fatty acid metal salt waxes, fatty acid ester waxes, partially-saponified fatty acid ester waxes, silicone varnishes, higher alcohols, carnauba waxes, polyolefins such as low molecular weight polyethylene and polypropylene, and the like waxes. In particular, polyolefins having a softening point of from 70 to 150° C., and preferably from 120 to 150° C., which is determined by a ring and ball method, are preferable.

The toner may include a cleanability improver to remove the residual developer on a photoreceptor and a first transfer medium even after a toner image is transferred. Specific examples of such a cleanability improver include fatty acids and their metal salts such as stearic acid, zinc stearate, and calcium stearate; and polymer fine particles such as polymethylmethacrylate and polystyrene, which are manufactured by a method such as soap-free emulsion polymerization methods. The polymer fine particles having relatively a narrow particle diameter distribution and a volume average particle diameter of from 0.01 to 1 μm are preferably used in the toner of the present invention.

Manufacturing Method for Toner

The toner of the present invention is typically prepared by the following method:

(1) toner constituents including at least a binder resin, a main charge controlling agent and a pigment are mechanically mixed (mixing process);

(2) the toner constituents are kneaded while heated (kneading process);

(3) the kneaded mixture is cooled and then pulverized to form a powder (pulverizing process); and (4) the powder is classified to prepare a mother toner (classifying process).

The powder having an undesired particle diameter (hereinafter referred to as a by-product) may be reused for the mixing and kneading processes. When the by-product is re-used, the mixing ratio of the by-product to the new raw materials is preferably 1/99 to 50/50 by weight.

The procedure for the mixing process is not particularly limited, and the toner constituents are simply mixed by a known mechanical mixer having a rotating blade, etc.

In the kneading process following the mixing process, the mixture is contained in a kneader and then kneaded upon application of heat. Suitable kneaders include the kneaders include single-axis or double-axis continuous kneaders and batch kneaders such as roll mills. Specific examples of the kneaders include KTK double-axis extruders manufactured by Kobe Steel, Ltd., TEM extruders manufactured by Toshiba Machine Co., Ltd., double-axis extruders manufactured by KCK Co., Ltd., PCM double-axis extruders manufactured by Ikegai Corp., and KO-KNEADER manufactured by Buss AG.

In the kneading process, it is important to control the kneading conditions so as not to cut the molecular chains of the binder resin used in the toner.

Specifically, when the mixture is kneaded at a temperature much lower than the softening point of the binder resin used, the molecular chains of the binder resin tend to be cut. When the kneading temperature is too high, the pigment in the mixture cannot be fully dispersed.

In the pulverizing process, it is preferable that the kneaded mixture is at first crushed to prepare coarse particles (hereinafter referred to as a crushing step) and then the coarse particles are pulverized to prepare fine particles (hereinafter referred to as a pulverizing step). In the pulverizing step, a pulverizing method in which coarse particles are pulverized by being collided against a collision plate by jet air or a pulverizing method in which coarse particles are pulverized at a narrow gap between a mechanically rotating rotor and a stator is preferably used.

After the pulverizing process, the powder is air-classified using centrifugal force to obtain toner particles (i.e., a mother toner) having a predetermined average particle diameter, for example, from 5 to 20 μm.

Then the mother toner may be mixed with the external additive of the present invention to improve the fluidity, developability and transferability.

Suitable mixers include known mixers for mixing powders, which preferably have a jacket to control the inside temperature thereof. By changing the timing when the external additive is added or the addition speed of the external additive, the stress on the external additive (i.e., the adhesion state of the external additive with the mother toner particles) can be changed. Of course, by changing rotating number of the blade of the mixer used, mixing time, mixing temperature, etc., the stress can also be changed. In addition, a mixing method in which at first a relatively high stress is applied and then a relatively low stress is applied to the external additive, or vice versa, can also be used.

Specific examples of the mixers include V-form mixers, locking mixers, Loedge Mixers, Nauter Mixers, Henshel Mixers and the like mixers.

When the toner of the present invention is used for a two-component developer, the toner is mixed with a magnetic carrier. The weight ratio of the toner to the carrier is preferably from 1/100 to 10/100.

Suitable carriers for use in the two component developer include known carrier materials such as iron powders, ferrite powders, magnetite powders, magnetic resin carriers, which have a particle diameter of from 20 to 200 $\mu$m. The surface of the carriers may be coated with a resin. Specific examples of such resins include amino resins such as urea-formaldehyde resins, melamine resins, benzoguanamine resins, urea resins, and polyamide resins, and epoxy resins. In addition, vinyl or vinylidene resins such as acrylic resins, polymethylmethacrylate resins, polyacrylonitirile resins, polyvinyl acetate resins, polyvinyl alcohol resins, polyvinyl butyral resins, polystyrene resins, styrene-acrylic copolymers, halogenated olefin resins such as polyvinyl chloride resins, polyester resins such as polyethyleneterephthalate resins and polybutyleneterephthalate resins, polycarbonate resins, polyethylene resins, polyvinyl fluoride resins, polyvinylidene fluoride resins, polytrifluoroethylene resins, polyhexafluoropropylene resins, vinylidenefluoride-acrylate copolymers, vinylidenefluoride-vinylfluoride copolymers, copolymers of tetrafluoroethylene, vinylidenefluoride and other monomers including no fluorine atom, and silicone resins. If desired, an electroconductive powder may be included in the toner. Specific examples of such electroconductive powders include metal powders, carbon blacks, titanium oxide, tin oxide, and zinc oxide. The average particle diameter of such electroconductive powders is preferably not greater than 1 $\mu$m. When the particle diameter is greater than 1 $\mu$m, it is difficult to control the electric resistance of the resultant toner.

The toner of the present invention can also be used as a one-component magnetic developer including a magnetic material in the toner, or a one-component non-magnetic developer.

Full Color Image Developing Method

The toner of the present invention can be preferably used for a full-color image forming method using non-magnetic one component developer and an electroconductive brush. Specifically, by repeating an image forming operation using color toners in which a color image (such as yellow, magenta, cyan and black images) formed on an image bearer is transferred on a receiving material, a full color image is formed on the receiving material. In this case, at least one of the color toners is the toner of the present invention. The resultant full color image has good halftone reproducibility.

In this full-color image forming method, a developing device has plural developing sections for forming plural color toner images. Each of the developing sections has a developing roller configured to bear a developer layer thereon and a regulating blade configured to control the thickness of the developer layer. Electrostatic latent images, which correspond to the respective color images and which are formed on the image bearer one by one, are developed by the developing sections, resulting in formation of color toner images on the image bearer one by one. The color toner image is transferred on a receiving material one by one to form a full color image. The electrostatic latent images can be formed by, for example, charging a photoreceptor (i.e., image bearer) with a charger using an electroconductive brush and then irradiating the photoreceptor with imagewise light. The color toner images may be transferred on an intermediate transfer medium to form a full color image thereon. The full color image is then transferred on a receiving material.

In this case, a reverse developing method is preferably used in which an electrostatic latent image is developed with a developer having a charge whose polarity is the same as that of the electrostatic latent image.

In addition, it is preferable that an electrostatic latent image on a photoreceptor is developed with a developer on the developing roller while the developer directly contacts the photoreceptor and the developing roller is rotated at a speed higher than that of the photoreceptor.

When the toner of the present invention is used for image forming apparatus having a corotron transfer device, the transferability of toner images can be improved. However, the effect of the toner can be fully exerted when the toner is used for image forming apparatus in which toner images are transferred from an image bearer to a receiving material while transfer means such as a transfer roller presses the receiving material toward the image bearer.

Further, in an image developer of an image forming apparatus including at least a mechanism which drives an image bearer by contacting a receiving material thereto, a high pressure is inevitably placed between the image bearer and the receiving material, and therefore the toner image transferability cannot be improved even when the corotron transfer method is used. However, the toner of the present invention effectively works in such a system.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Preparation for External Additive

The following components were mixed to dissolve polydimethyl siloxane in toluene.

| | |
|---|---|
| Polydimethyl siloxane (manufactured by Shin-Etsu Chemical Co., Ltd., and having a viscosity of 350 cs) | 3 |
| Toluene | 100 |

Thirty (30) parts of a silica OX-50 manufactured by Nippon Aerosil Co. and having an average primary particle diameter of 40 nm was gradually added into the solution and dispersed while agitating and irradiating the mixture with ultrasonic waves.

After it was visually confirmed that there were no agglomerated particles of the silica in the dispersion, the toluene was removed using a rotary evaporator. The thus prepared solid was then dried at 50° C. under a reduced pressure using a decompression oven such that the weight of the residue did not change. Thus a silicone-coated silica was prepared. The thus prepared silicone-coated powder was subjected to a heat treatment at 200° C. for 2 hours in an electric furnace under nitrogen gas flow. Then the powder was dissociated (i.e., the agglomerated powder was released) using a jet mill and then collected by a bag filter. The average primary particle diameter of the silicone-coated was not changed (i.e., 40 nm). The external additive was prepared while changing the conditions of the dispersion operation in the hydrophobizing treatment, the heat treatment conditions, etc. such that a compound having an organopolysiloxane structure remains in the residual components of the external additive treated with chloroform when analyzed by the Py-GCMS analysis mentioned above.

Preparation for Black Mother Toner

The following components were mixed and agitated in a flasher.

| | |
|---|---|
| Water | 1200 |
| Phthalocyanine Green aqueous cake (solid content of 30%) | 200 |
| Carbon black | 540 |

(Tradenamed as MA60 and manufactured by Mitsubishi Chemical Corp.)

Then 1200 parts of a polyester resin having an acid value of 3, a hydroxy value of 25, number average molecular weight Mn of 45,000, a ratio weight average molecular weight Mw/Mn of 4.0, and a glass transition temperature Tg of 60° C.) were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Thus a black master batch pigment was prepared.

Then the following components were mixed.

| | |
|---|---|
| The above-mentioned polyester resin | 100 |
| The above-mentioned black master batch pigment | 5 |
| Charge controlling agent | 4 |

(tradenamed as BONTRON E-84 and manufactured by Orient

Chemical Industries Co., Ltd.)

The mixture was melted and kneaded by a two-roll mill. Then the mixture was cooled by rolling. The mixture was pulverized by a pulverizer (I TYPE MILL manufactured by Nippon Pneumatic Mfg. Co., Ltd.) which is a jet mill using a collision plate, and then the pulverized mixture was air-classified by a classifier (DS CLASSIFIER manufactured by Nippon Pneumatic Mfg. Co., Ltd.) which uses circling air. Thus, a black mother toner having a volume average particle diameter of 13.5 μm was prepared.

Preparation for Yellow Mother Toner

The following components were mixed and agitated in a flasher.

| | |
|---|---|
| Water | 600 |
| Pigment Yellow 17 aqueous cake | 1200 |

Then 1200 parts of the above-mentioned polyester resin were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a yellow master batch pigment was prepared.

Then the following components were mixed.

| | |
|---|---|
| The above-mentioned polyester resin | 100 |
| The above-mentioned yellow master batch pigment | 8 |
| Charge controlling agent | 2 |

(BONTRON E-84)

The mixture was melted and kneaded by a two-roll mill. Then the mixture was cooled by rolling. The mixture was pulverized and air-classified in the same way as performed in the black toner preparation process. Thus, a yellow mother toner having a volume average particle diameter of 13.2 μm was prepared.

Preparation for Magenta Mother Toner

The following components were mixed and agitated in a flasher.

| | |
|---|---|
| Water | 600 |
| Pigment Red 57 aqueous cake (solid content of 50%) | 1200 |

Then 1200 parts of the above-mentioned polyester resin were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a magenta pigment master batch was prepared.

Then the following components were mixed.

| | |
|---|---|
| The above-mentioned polyester resin | 100 |
| The above-mentioned magenta master batch pigment | 8 |
| Charge controlling agent | 2 |

(Bontron E-84)

The mixture was melted and kneaded by a two-roll mill. Then the mixture was cooled by rolling. The mixture was pulverized and air-classified in the same way as performed in the black toner preparation process. Thus, a magenta mother toner having a volume average particle diameter of 13.5 μm was prepared.

Preparation for Cyan Mother Toner

The following components were mixed and agitated in a flasher.

| | |
|---|---|
| Water | 600 |
| Pigment Blue 15:3 aqueous cake (solid content of 50%) | 1200 |

Then 1200 parts of the above-mentioned polyester resin were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a cyan master batch pigment was prepared.

Then the following components were mixed.

| The above-mentioned polyester resin | 100 |
|---|---|
| The above-mentioned cyan master batch pigment | 8 |
| Charge controlling agent | 2 |

(Bontron E-84)

The mixture was melted and kneaded by a two-roll mill. Then the mixture was cooled by rolling. The mixture was pulverized and air-classified in the same way as performed in the black toner preparation process. Thus, a cyan mother toner having a volume average particle diameter of 13.4 μm was prepared.

Preparation for Color Toners

One hundred (100) parts of each of the above-prepared four mother toners were mixed with 1.0 part of the external additive prepared above using a Henshel mixer. The mixture was sieved using a screen having openings of 50 μm to remove coarse particles. Thus, four-color toners of Example 1 were prepared.

When these toners were evaluated as two-component developers, the toners were mixed with a ferrite carrier having an average particle diameter of 50 μm and coated with a silicone resin such that the thickness of the coated layer was 0.3 μm. Then 100 parts of the carrier were mixed with 5 parts of each color toner using a TURBULA mixer to prepare four-color developers.

The thus prepared four-color developers were set in a modified full color laser copier IMAGIO COLOR 2800 (Evaluation model A) manufactured by Ricoh Co., Ltd. This copier uses a reverse developing method in which the polarity of the electrostatic latent image is the same as that of charge of the developer.

Example 2

The procedures for preparation and evaluation of the color toners in Example 1 was repeated except that the mixing and heat-treatment conditions of the hydrophobizing agent were controlled such that the residual components of the external additive treated with chloroform included at least a compound having an organosiloxane structure having the following formula (A) to prepare and evaluate four-color toners of Example 2.

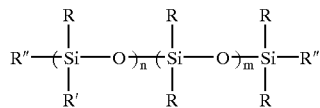
(A)

wherein R represents an alkyl group having from 1 to 3 carbon atoms; R' represents a silicone oil modification group such as such as an alkyl group, a halogenated alkyl group, a phenyl group or a modified phenyl group; R" represents an alkyl group having from 1 to 3 carbon atoms or an alkoxy group; and n and m are independently an integer and satisfy the following relationship:

$$1 \leq (n+m).$$

Example 3

The procedures for preparation and evaluation of the color toners in Example 1 was repeated except that the kind, and mixing and heat-treatment conditions of the hydrophobizing agent were controlled such that the pyrolysates of the residual components of the external additive treated with chloroform included at least a compound having a ring siloxane structure having the following formula (B) (in this case, n is not less than 3) to prepare and evaluate four-color toners of Example 3.

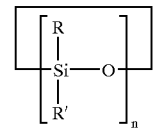
(B)

wherein R represents an alkyl group having from 1 to 3 carbon atoms; and R' represents a silicone oil modification group such as an alkyl group, a halogen modified alkyl group, a phenyl group or a modified phenyl group.

The Py-GCMS chromatogram of the pyrolysates of the residual components of the external additive is shown in FIG. 1.

Example 4

The procedures for preparation and evaluation of the color toners in Example 1 was repeated except that the kind, and mixing and heat-treatment conditions of the hydrophobizing agent were controlled such that the pyrolysates of the residual components of the external additive treated with chloroform included at least a compound having a ring siloxane structure having the following formula (B) (in this case, n is not less than 4) to prepare and evaluate four-color toners of Example 4.

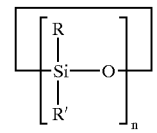
(B)

wherein R represents an alkyl group having from 1 to 3 carbon atoms; and R' represents a silicone oil modification group such as an alkyl group, a halogen modified alkyl group, a phenyl group or a modified phenyl group.

Figure 2:
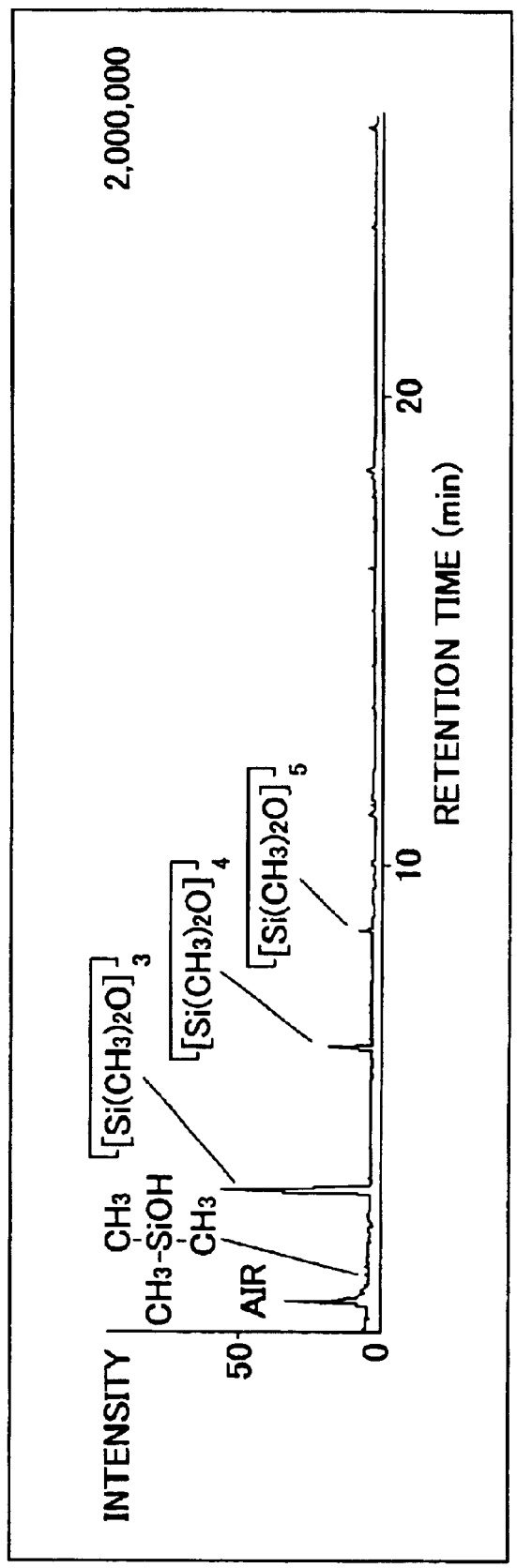
FIG. 2 is a Py-GCMS chromatogram showing the pyrolysates of the residual components of an external additive treated with chloroform prepared in Example 4.

The Py-GCMS chromatogram of the pyrolysates of the residual components of the external additive is shown in FIG. 2.

Example 5

The procedures for preparation and evaluation of the color toners in Example 1 was repeated except that the hydrophobizing agent was replaced with hexaethyldisilazane to prepare and evaluate four-color toners of Example 5.

Example 6

The procedures for preparation and evaluation of the color toners in Example 1 was repeated except that the addition quantity of polydimethylsiloxane was changed to 1.0 part and the heat treatment after the hydrophobizing treatment was not performed to prepare and evaluate four-color toners of Example 6.

Example 7

The procedures for preparation and evaluation of the color toners in Example 1 was repeated except that the inorganic fine particles (i.e., the silica OX-50) of the external additive was replaced with titanium oxide (TAF110A from Fuji Titanium Industry Co., Ltd.) having an average primary particle diameter of 50 nm to prepare and evaluate four-color toners of Example 7.

Example 8

The procedures for preparation and evaluation of the color toners in Example 1 was repeated except that the inorganic fine particles of the external additive was replaced with alumina (AL OXIDE-C manufactured by Nippon Aerosil Co.) having an average primary particle diameter of 13 nm to prepare and evaluate four-color toners of Example 8.

Example 9

The procedures for preparation and evaluation of the color toners in Example 1 was repeated except that each of the color toners was prepared as follows to prepare and evaluate four-color toners of Example 9:

The following components were mixed with a Henshel mixer such that the pyrolysates of the residual components of the toners treated with chloroform included a compound having a ring siloxane structure.

Silica OX-50 hydrophobized by hexamethyldisilazane 1.0

Color mother toner 100

Polydimethyl siloxane 0.2

(manufactured by Shin-Etsu Chemical Co., Ltd. and having a viscosity of 100 cs)

Figure 3:
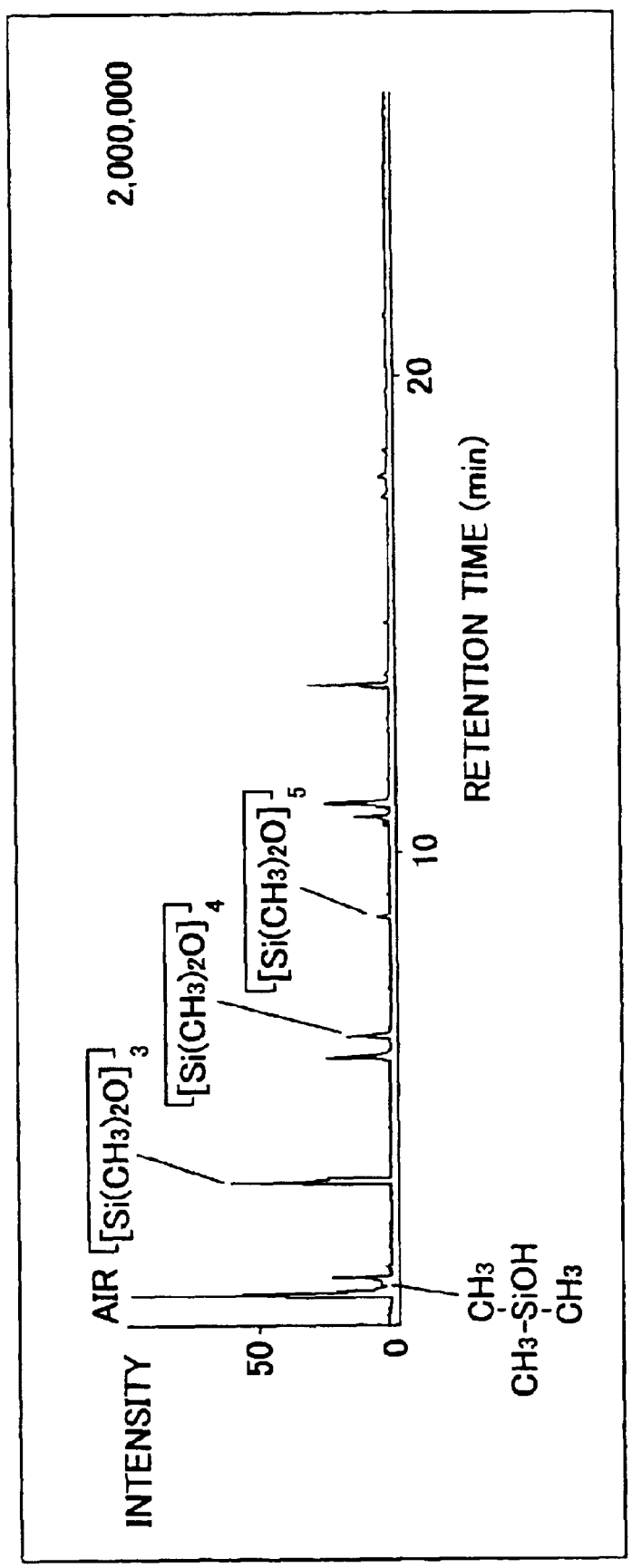
FIG. 3 is a Py-GCMS chromatogram showing the pyrolysates of the residual components of toners treated with chloroform prepared in Example 9.
Figure 4:
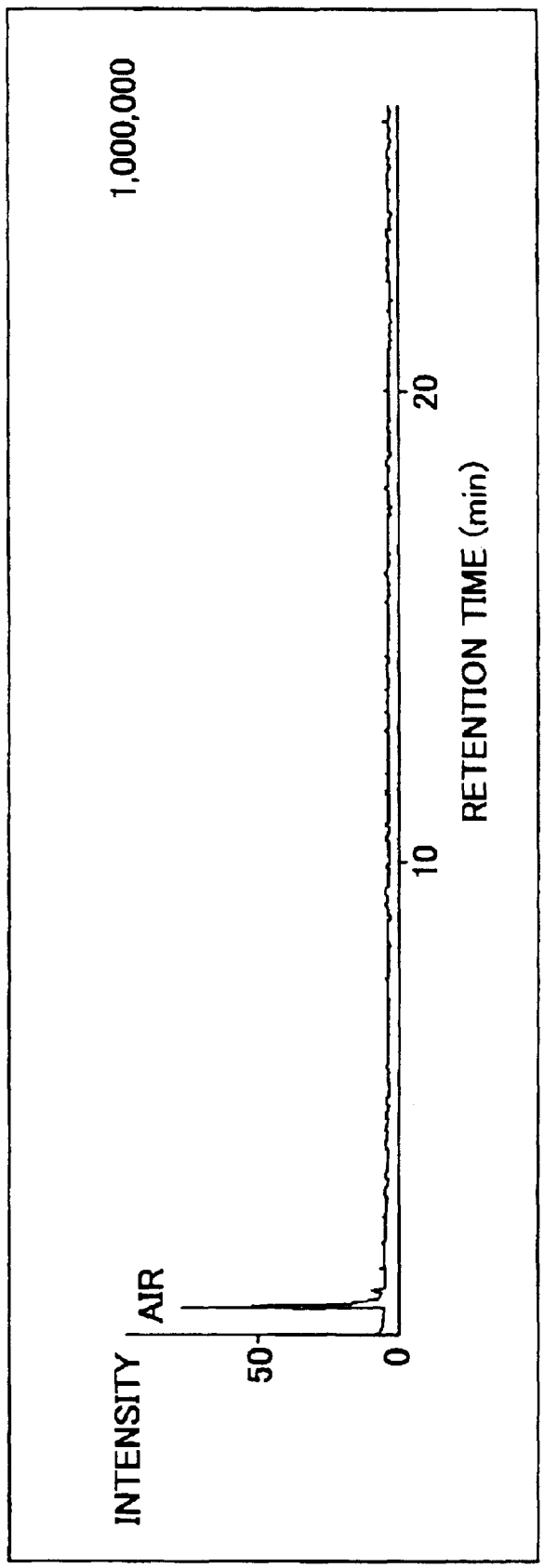
FIG. 4 is a Py-GCMS chromatogram showing the pyrolysates of the residual components of an external additive treated with chloroform prepared in Comparative Example 3.
Figure 5:
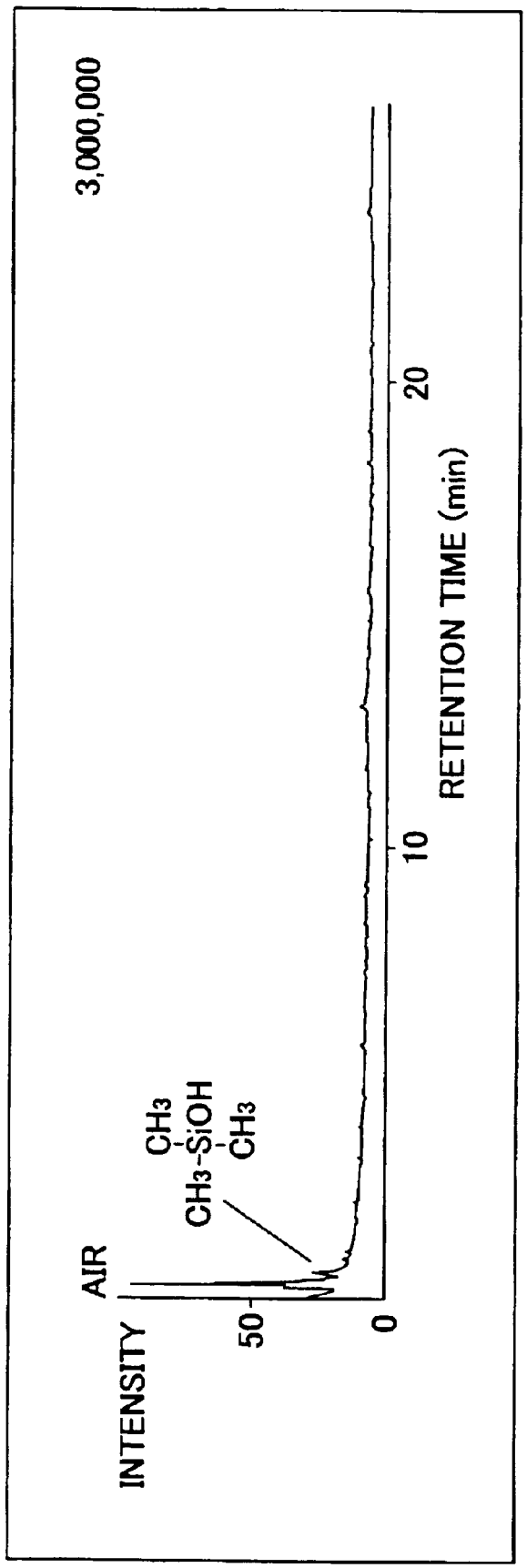
FIG. 5 is a Py-GCMS chromatogram showing the pyrolysates of the residual components of an external additive treated with chloroform prepared in Comparative Example 4.
Figure 6:
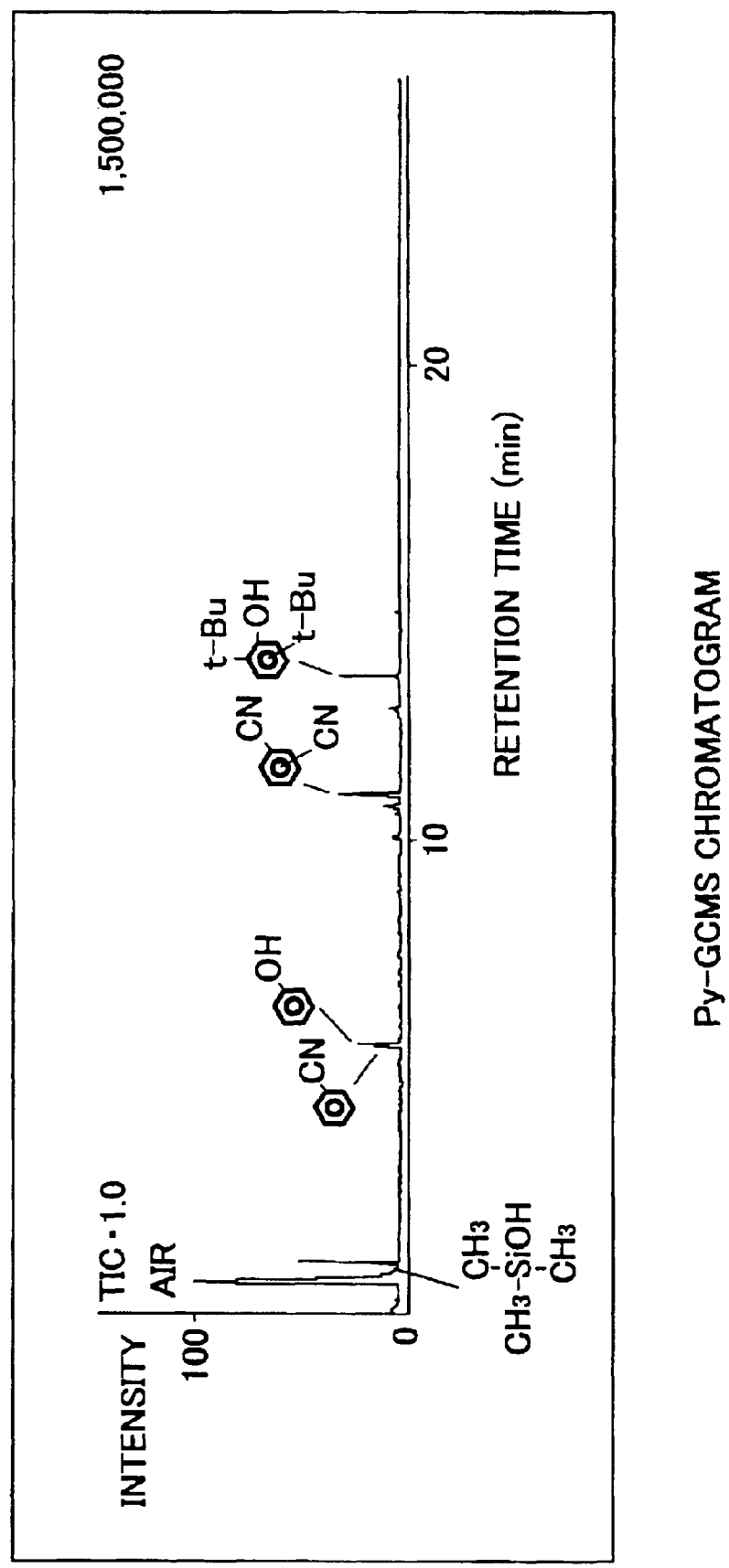
FIG. 6 is a Py-GCMS chromatogram showing the pyrolysates of the residual components of toners treated with chloroform prepared in Comparative Example 5.

The Py-GCMS chromatogram of the pyrolysates of the residual components of the toners is shown in FIG. 3.

Example 10

The procedures for preparation and evaluation of the color toners in Example 1 was repeated except that 0.2 parts of a hydrophobic silica H2000 manufactured by Clariant Japan K.K. and having an average primary particle diameter of 10 nm were added as the second external additive to prepare and evaluate four-color toners of Example 10.

Example 11

The procedures for preparation and evaluation of the color toners in Example 1 was repeated except that 0.2 parts of a hydrophobic silica H2000 manufactured by Clariant Japan K.K. and having an average primary particle diameter of 10 nm as the second external additive and 0.3 parts of a titanium oxide MT-150AFM manufactured by Tayca Corp. and having an average primary particle diameter of 15 nm were added as the third external additive to prepare and evaluate four-color toners of Example 11.

Example 12

The procedures for preparation and evaluation of the color toners in Example 1 was repeated except that 0.5 parts of fine particles of an acrylic resin MP-1000 manufactured by Sohken Chemical Co., Ltd. and having an average particle diameter of 400 nm were added as the second external additive to prepare and evaluate four-color toners of Example 12.

Example 13

The procedures for preparation and evaluation of the color toners in Example 1 was repeated except that 0.5 parts of a hydrophobic silica H2000 manufactured by Clariant Japan K.K. were added as the second external additive and 0.5 parts of a particulate acrylic resin MP-1000 manufactured by Sohken Chemical Co., Ltd. and having an average particle diameter of 400 nm were added as the third external additive to prepare and evaluate four-color toners of Example 13.

Example 14

The color toners prepared in Example 1 were evaluated as non-magnetic one-component developers. The evaluation method was as follows:

Each of the non-magnetic color developer was set in a full color laser printer IPSIO 5000 (Evaluation model B) manufactured by Ricoh Co., Ltd. In the printer, four-color toner images were formed one by one on a belt-shaped photoreceptor using a developing device having four-color developing sections. The developing method was a reverse developing method. The color toner images formed on the photoreceptor were transferred one by one to an intermediate transfer medium to form a full color image thereon. The full color image on the intermediate transfer medium was then transferred onto a receiving material. Each of the developing sections has a developing roller formed of an elastic material and a stainless steel blade configured to form a developer layer (i.e., a layer of the non-magnetic one-component developer) on the developing roller.

Example 15

The color toners prepared in Example 1 were evaluated as non-magnetic one-component developers. The evaluation method was as follows:

The four-color developers were set in a tandem type full color LED printer GL8300 (Evaluation model C) manufactured by Fujitsu Ltd. In the printer, four-color toner images were formed on four drum-shaped photoreceptors, respectively, using an image developer having four-color developing sections. The developing method was a reverse developing method. The color toner images were transferred one by one to an intermediate transfer medium to form a full color image thereon. The full color image was then transferred on a receiving material. Each of the developing sections has a developing roller formed of an elastic material and a stainless steel blade configured to form a developer layer (i.e., a layer of the non-magnetic one-component developer) on the developing roller.

Example 16

Figure 7:
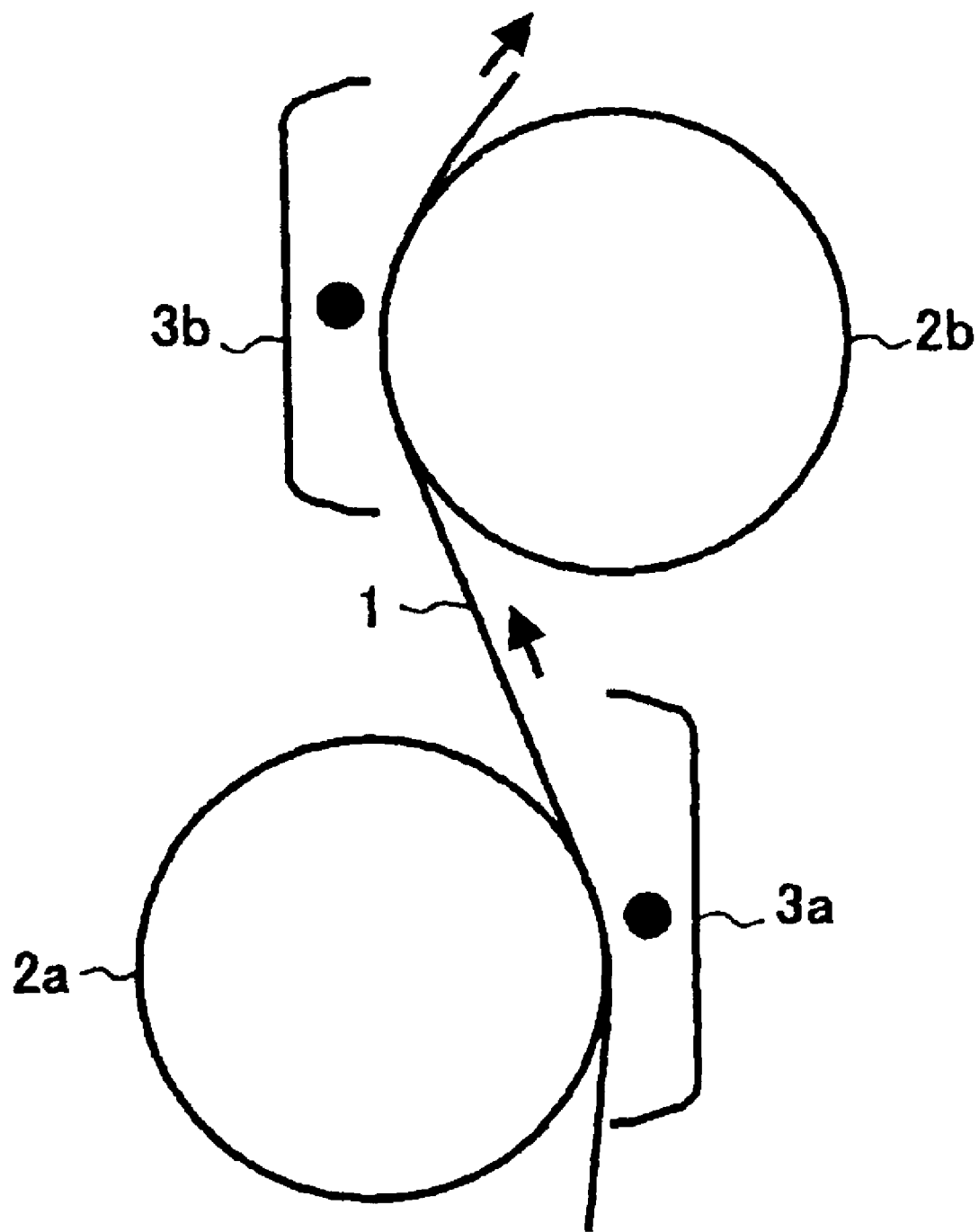
FIG. 7 is a schematic view illustrating an embodiment of a receiving-material drive type image transfer mechanism.

The color toners prepared in Example 1 were evaluated as non-magnetic one-component developers. The evaluation method was as follows:

The four-color developers were set in a full color on-demand printer DCP32D manufactured by XEIKON NV, which is capable of simultaneously printing both sides of receiving materials. In the printer, a non-magnetic two-component developing unit including a mechanism in which a receiving material drives the latent image bearer while contacting thereto. The drive method will be explained referring to FIG. 7 which illustrates a typical embodiment of the method. In this method, a receiving material 1 is contacted with an image-bearing member 2a on which a toner image is formed to drive the image-bearing member 2a while the toner image is transferred on one side of the receiving material 1 by a transfer member 3a. In addition, the receiving material 1 is contacted with another image-bearing member 2b on which a toner image is formed to drive the image-bearing member 2b while the toner image is transferred on the other side of the receiving material 1 by a transfer member 3b. In the paper-drive method, image-bearing members are driven by friction and/or electrostatic force between the image-bearing members and a receiving material.

The fixing temperature of the oven was 140° C., and the printing speed was optionally set at 15 ppm/A4 or 35 ppm/A4.

Comparative Example 1

The procedures for preparation and evaluation of the color toners in Example 1 was repeated except that the average primary particle diameter of the inorganic particulate material of the external additive (i.e., silica OX-50) was changed to 150 nm to prepare and evaluate four-color toners of Comparative Example 1.

Comparative Example 2

The procedures for preparation and evaluation of the color toners in Example 1 was repeated except that the mixing and heat-treatment conditions of the hydrophobizing agent were controlled such that the residual components of the external additive treated with chloroform did not include a compound having an organosiloxane structure to prepare and evaluate four-color toners of Comparative Example 2.

Evaluation Method

Ten thousand (10,000) copies of an image having an image area of 7% were produced. The evaluation items are as follows:

1) Image density

The image densities of four-color solid images formed on a receiving paper, TYPE 6000 manufactured by Ricoh Co., Ltd., was measured by a densitometer X-Rite manufactured by X-Rite Corp. The image densities were evaluated by being classified into the following four grades:

⊚: 1.8≦image density<2.2 (excellent)

◯: 1.4≦image density<1.8

Δ: 1.2≦image density<1.4

X: image density<1.2 (poor)

2) Thin line image reproducibility

Black color thin line images having 600 dpi and consisting of four-color toners were produced on the receiving paper TYPE 6000. The images were visually observed to classify the thin line images into the following four grades.

⊚: Excellent (Thin line images are faithfully produced)

◯: Good

Δ: Slightly poor

X: Poor (Thin line images are not faithfully produced)

3) Background fouling

A white image was formed on the photoreceptor. After the white image was developed, the photoreceptor was stopped before the transfer process. The developers adhered on the photoreceptor were transferred on an adhesive tape. The optical densities of the adhesive tape having the developer thereon and the adhesive tape itself (i.e., the adhesive tape without developers thereon) were measured by 938 SPECTRODENSITOMETER manufactured by X-Rite Corp., to obtain the difference between the optical densities. The greater the difference, the worse the background fouling. The background fouling was evaluated by being classified into the following four grades.

⊚: Excellent (Optical density difference is small)

◯: Good

Δ: Slightly poor

X: Poor (Optical density difference is large)

4) Half tone image reproducibility

Black color half tone images consisting of four-color toners, in which one dot image and one dot white image were alternately recorded repeatedly, were formed on a rough paper, SABRE-X80 PAPER manufactured by JAwer Co. The half tone images were visually observed to classify the dot reproducibility into the following four grades.

⊚: Excellent (Dot images are faithfully produced)

◯: Good

Δ: Slightly poor

X: Poor (Dot images are not faithfully produced)

5) Hollow character (Omissions in character images)

Black color character images consisting of four-color toners were produced on a thick paper having a weight of 190 g/cm². The images were visually observed to classify the hollow character into the following four grades.

⊚: Excellent (hollows are hardly observed)

◯: Good

Δ: Slightly poor

X: Poor (hollows are seriously produced)

The results are shown in Table 1.

TABLE 1

|  | Image density | Thin line reproducibility | Background fouling | Half tone reproducibility | Hollow character | *Siloxane structure |
|---|---|---|---|---|---|---|
| Example 1 | ⊚ | ◯ | ◯ | ◯ | ⊚ | ◯ |
| Example 2 | ⊚ | ◯ | ⊚ | ◯ | ⊚ | ◯ |
| Example 3 | ⊚ | ◯ | ◯ | ◯ | ⊚ | ◯ |
| Example 4 | ⊚ | ◯ | ⊚ | ⊚ | ⊚ | ◯ |
| Example 5 | ◯ | ◯ | Δ | ◯ | Δ | ◯ |
| Example 6 | ◯ | ◯ | ◯ | ◯ | Δ | ◯ |
| Example 7 | ◯ | ◯ | ◯ | Δ | ◯ | ◯ |
| Example 8 | ◯ | ◯ | ◯ | ◯ | Δ | ◯ |
| Example 9 | ◯ | Δ | ◯ | ◯ | ◯ | ◯ |
| Example 10 | ⊚ | ◯ | ⊚ | ◯ | ⊚ | ◯ |
| Example 11 | ⊚ | ◯ | ⊚ | ⊚ | ⊚ | ◯ |
| Example 12 | ⊚ | ⊚ | ⊚ | ◯ | ⊚ | ◯ |
| Example 13 | ⊚ | ⊚ | ⊚ | ⊚ | ⊚ | ◯ |
| Example 14 | ◯ | ◯ | ◯ | ◯ | ⊚ | ◯ |
| Example 15 | ◯ | ◯ | ◯ | ◯ | ⊚ | ◯ |

TABLE 1-continued

|  | Image density | Thin line reproducibility | Background fouling | Half tone reproducibility | Hollow character | *Siloxane structure |
|---|---|---|---|---|---|---|
| Example 16 | ◉ | ○ | ○ | ○ | ◉ | ○ |
| Comparative Example 1 | X | X | X | X | X | X |
| Comparative Example 2 | X | X | Δ | X | X | X |
| Comparative Example 3 | X | X | Δ | X | X | X |
| Comparative Example 4 | Δ | Δ | Δ | X | X | X |
| Comparative Example 5 | Δ | Δ | Δ | X | X | X |

*Siloxane structure
○: A compound having an organopolysiloxane structure or a compound including an organopolysiloxane structure having the formula A is included in the solvent-treated residual components of the external additive or the toner used, or a compound having a ring siloxane structure is included in the pyrolysates of the solvent-treated residual components of the external additive or the toner used.
X: A compound having an organopolysiloxane structure or an organopolysiloxane structure having the formula A is not included in the solvent-treated residual components of the external additive or the toner used, or a compound having a ring siloxane structure is not included in the pyrolysates of the solvent-treated residual components of the external additive or the toner used.

This document claims priority and contains subject matter related to Japanese Patent Application No. 2001-059027 filed on Mar. 2, 2001, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An external additive for a toner, having an average primary particle diameter not greater than 100 nm and comprising:
    inorganic fine particles; and
    a hydrophobizing agent applied to the surface of the inorganic fine particles,
    wherein after the external additive is treated with chloroform, pyrolysates of the residual components include a compound having at least one siloxane structure.

2. The external additive of claim 1, wherein the pyrolysates of the residual components include the compound having the ring siloxane structure, and wherein the ring siloxane structure has the following formula (B):

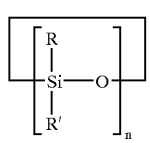
(B)

wherein R represents an alkyl group having from 1 to 3 carbon atoms; R' represents a silicone oil modification group modified by an alkyl group, a halogen modified alkyl group, a phenyl group or a modified phenyl group; and n is an integer not less than 3.

3. The external additive of claim 2, wherein n is an integer not less than 4.

4. The external additive of claim 1, wherein the hydrophobizing agent is a silicone oil.

5. The external additive of claim 4, wherein the silicone oil is applied to the surface of the inorganic fine particles upon application of heat.

6. The external additive of claim 1, wherein the inorganic fine particles are selected from the group consisting of silica, titanium oxide and alumina.

7. A method for preparing an external additive for an electrophotographic toner, comprising:
    coating inorganic fine particles with a hydrophobizing agent; and
    heating the inorganic fine particles to form the external additive,
    wherein after the external additive is treated with chloroform, pyrolysates of the residual components include a compound having at least one ring siloxane structure.

8. The method of claim 7, wherein the coating is performed while the heating is performed.

9. The method of claim 7, wherein the coating is performed after the heating is performed.

10. A toner comprising:
    a binder resin;
    a colorant; and
    a first external additive,
    wherein the toner has a volume average particle diameter not greater than 15 μm, and
    wherein the first external additive has an average primary particle diameter not greater than 100 nm and comprises:
    inorganic fine particles; and
    a hydrophobizing agent applied to the surface of the inorganic fine particles,
    wherein after the external additive is treated with chloroform, pyrolysates of the residual components include a compound having at least one ring siloxane structure.

11. The toner of claim 10, wherein the ring siloxane structure has the following formula (B):

(B) 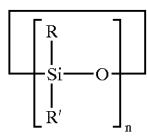

wherein R represents an alkyl group having from 1 to 3 carbon atoms; R' represents a silicone oil modification group modified by an alkyl group, a halogen modified alkyl group, a phenyl group or a modified phenyl group; and n is an integer not less than 3.

12. The toner of claim 11, wherein n is an integer not less than 4.

13. The toner of claim 10, wherein the hydrophobizing agent is a silicone oil.

14. The toner of claim 13, wherein the silicone oil is applied to the surface of the inorganic fine particles upon application of heat.

15. The toner of claim 10, wherein the inorganic fine particles are selected from the group consisting of silica, titanium oxide and alumina.

16. The toner of claim 10, further comprising a second external additive having an average primary particle diameter less than the average primary particle diameter of the first external additive.

17. The toner of claim 16, further comprising a third external additive comprising fine particles of a resin, wherein the fine particles of the resin has a larger average particle diameter than the average particle diameter of the first external additive.

18. The toner of claim 10, further comprising a third external additive comprising fine particles of a resin, wherein the fine particles of the resin has an average particle diameter greater than the average particle diameter of the first external additive.

19. An image forming apparatus comprising:
at least one image-bearing member configured to bear an electrostatic latent image;
an image developer comprising at least one developing section configured to develop the electrostatic latent image with a developer comprising a toner to form a toner image on the image-bearing member, and
an image transferer configured to transfer the toner image onto a receiving material,
wherein the toner comprises:
a binder resin;
a colorant; and
a first external additive,
wherein the first external additive comprises:
an inorganic particulate material; and
a hydrophobizing agent applied to the surface of the inorganic fine particles,
wherein after the external additive is treated with chloroform, pyrolysates of the residual components include a compound having at least one ring siloxane structure.

20. The image forming apparatus of claim 19, wherein the developer is a two-component developer comprising a magnetic carrier and the toner.

21. The image forming apparatus of claim 19, wherein the image developer includes plural developing portions, wherein each of the plural developing portions is configured to develop plural electrostatic latent images on the image bearer with a different color developer to form a different color toner image on the image bearer, and wherein the image transferer transfers the plural color toner images onto the receiving material one by one to form a full color image on the receiving material.

22. The image forming apparatus of claim 21, wherein each of the plural developing portions comprises:
a developing roller configured to bear a layer of the developer thereon; and
a blade configured to form the layer of the developer on the developing roller.

23. The image forming apparatus of claim 19, including the intermediate transfer medium and the image developer including plural developing portions, wherein each of the plural developing portions is configured to develop the electrostatic latent image with a different color developer to form a different color toner image on the image bearer, and
wherein the image transferer further comprises:
a first transfer member configured to transfer the different color toner images on the image-bearing members to the intermediate transfer medium while the first transfer member contacts the intermediate transfer medium and the intermediate transfer medium contacts the image-bearing member, to form a full color image on the intermediate transfer medium; and
a second transfer member configured to transfer the full color image on the intermediate transfer medium to the receiving material while the second transfer member contacts the intermediate transfer medium and the intermediate transfer medium contacts the receiving material.

24. The image forming apparatus of claim 19, wherein the image transferer further comprises:
a transfer member configured to transfer the toner image on the image bearer onto the receiving material while the transfer member contacts the receiving material and the receiving material contacts the image bearer.

25. The image forming apparatus of claim 19, including plural image bearers and the intermediate transfer medium, and the image developer including plural developing portions, wherein each of the plural developing portions is configured to develop the electrostatic latent image with a different color developer to form a different color toner image on the respective image bearer, and
wherein the image transferer further comprises:
a first transfer member configured to transfer the different color toner images on the plural image bearers onto the intermediate transfer medium while the first transfer member contacts the intermediate transfer medium and the intermediate transfer medium contacts the plural image bearers, to form a full color image on the intermediate transfer medium; and
a second transfer member configured to transfer the full color image onto the intermediate transfer medium to the receiving material while the second transfer member contacts the intermediate transfer medium and the intermediate transfer medium contacts the receiving material.

26. The image forming apparatus of claim 19, further comprising a mechanism, wherein the receiving material drives the image bearer while contacting thereto.

27. The image forming apparatus of claim 19, wherein the ring siloxane structure has the following formula (B):

(B) 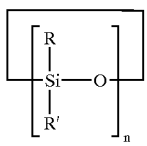

wherein R represents an alkyl group having from 1 to 3 carbon atoms; R' represents a silicone oil modification group modified by an alkyl group, a halogen modified alkyl group, a phenyl group or a modified phenyl group; and n is an integer not less than 3.

28. The image forming apparatus of claim 27, wherein n is an integer not less than 4.

29. The image forming apparatus of claim 19, wherein the hydrophobizing agent is a silicone oil.

30. The image forming apparatus of claim 29, further comprising a third external additive comprising fine particles of a resin, wherein the fine particles of the resin have an average particle diameter greater than the average primary particle diameter of the inorganic fine particles.

31. The image forming apparatus of claim 19, wherein the silicone oil is applied to the surface of the inorganic fine particles upon application of heat.

32. The image forming apparatus of claim 19, wherein the inorganic fine particles are selected from the group consisting of silica, titanium oxide and alumina.

33. The image forming apparatus of claim 19, further comprising a second external additive having an average primary particle diameter less than the average primary particle diameter of the inorganic fine particles.

34. The image forming apparatus of claim 19, further comprising a third external additive comprising fine particles of a resin, wherein the fine particles of the resin have an average particle diameter greater than the average primary particle diameter of the inorganic fine particles.

35. The image forming apparatus of claim 19, wherein said image transferer is configured to transfer the toner image onto the receiving material via an intermediate transfer medium.

* * * * *